United States Patent [19]

Kauffman et al.

[11] Patent Number: 5,135,278
[45] Date of Patent: Aug. 4, 1992

[54] RIGID SIDEWALL FOR RECREATIONAL VEHICLE

[75] Inventors: Ira H. Kauffman, Goshen; Homer Ratliff, Avilla, both of Ind.

[73] Assignee: Starcraft RV, Inc., Topeka, Ind.

[21] Appl. No.: 725,969

[22] Filed: Jul. 5, 1991

[51] Int. Cl.$^5$ .............................................. B60P 3/34
[52] U.S. Cl. ..................................... 296/27; 296/173
[58] Field of Search .................... 296/27, 26, 173, 168

[56] References Cited

U.S. PATENT DOCUMENTS

| | | | |
|---|---|---|---|
| 3,024,059 | 3/1962 | Hagerson | 296/173 |
| 3,050,331 | 8/1962 | Hansen | 296/27 |
| 3,582,131 | 6/1971 | Brown | 296/27 |
| 3,694,022 | 9/1972 | Dontigney | 296/27 |
| 3,709,551 | 6/1973 | McCarthy | 296/173 |
| 4,448,453 | 5/1984 | Irelan et al. | 297/27 |

OTHER PUBLICATIONS

"Palomino" pamphlet, by Palomino Vanguard Industries of Michigan, Inc., 1991.

Primary Examiner—Robert R. Song
Attorney, Agent, or Firm—Price, Heneveld, Cooper, DeWitt & Litton

[57] ABSTRACT

A rigid wall construction is provided for conventional fold-down campers wherein a camper shell is comprised of a frame having a plurality of walls of substantially equal height, at least two of which form opposing lower sidewalls. Attached to an upper edge of each lower sidewall is a hinged footwall having an upper hinged plate and a pendulate support member. The hinged upper plate of the footwall is coupled to a sidewall formed from a lightweight yet rigid material. The sidewall rotates about the hinge coupling with the footwall from a recumbent position within the closed shell to a vertical position above the footwall once extended. As the sidewall is extended, the pendulate support member moves down to engage the lower sidewall and support the raised sidewall. A camper top disposed above the camper shell supports the sidewall in the extended position.

10 Claims, 3 Drawing Sheets

2

RIGID SIDEWALL FOR RECREATIONAL VEHICLE

BACKGROUND OF THE INVENTION

The present invention relates to a new fold-down camper having rigid sidewalls and particularly to a fold-down camper where the sidewall has a section which shifts inwardly to allow the top to lower for storage and transportation.

Many types of commercial and recreational trailers are known. Recreational vehicles, whether self-powered or towed, are popularly used for camping or other recreational purposes. Campers may also be used as temporary shelter in certain business environments. Particularly popular are the fold-down campers which, when erected, provide ample living space for several persons. When not in use the fold-down camper collapses to a much smaller volume for easy transport and storage.

Because of the size and weight constrictions inherent in the design of fold-down campers, many are at least partially constructed from a lightweight, flexible material such as fiberglass and aluminum. In general, a camper may include a rectangular floor enclosed by several walls to form a lower frame which is mounted to a chassis for towing. A removable cap closes the frame and, in a raised position, forms a roof. Interconnecting the frame and the cap typically is a cloth or canvas fabric which forms the walls. The fabric may be supported by rods or poles to conform the fabric to the general dimensions of the camper. When the camper is collapsed, the rods supporting the fabric may be disassembled or folded and stored within the frame. The cap may then be lowered to enclose the frame and ready the camper for transport.

Generally, the fabric walls are not as durable or as effective at withstanding the elements as is a solid, rigid, material. Rain and snow may penetrate the material especially when a fabric, such as canvas, is being used. Fabric also does not provide the same protection against wind as does a sturdy, rigid material. A fold-down camper having solid, rigid sidewalls would more effectively block out unwanted light, wind and rain and is more durable than is a fold-down camper having fabric sidewalls.

Fold-down campers having rigid sidewalls are also easier to clean and maintain than are campers with fabric sidewalls. If a camper having a rigid sidewall needs to be cleaned, it can be sprayed with water and wiped clean. There is no worry of the contents of the camper getting wet or damaged. This is not the case with campers with fabric sidewalls. Moreover, fabric sidewalls may require special maintenance and care to keep clean. Once dirt, dust, mold or mildew get into the fabric, the fabric may need to be removed from the camper and cleaned using special processes.

One camper having fold-down walls available on the market today includes a rectangular frame a few feet in height, and a rigid sidewall which extends upwardly from the frame. The sidewall consists of two equidimensional panels coupled by a horizontally extending hinged seam. When the camper is erected, the two halves meet at the hinged seam to form a generally singular plane. When collapsed, the upper half folds along the hinge through approximately 180 and rests against the bottom half of the sidewall. The lower half of the wall folds into the frame to a substantially horizontal position by pivoting about a hinge within the wall of the frame. This design, when in the stowed position, requires more space than do other fold-down campers. Since the sidewall folds at its midsection, the height of the camper in a closed position includes the height of the base frame as well as twice the thickness of the sidewall. This effectively increases the ground to ceiling height of the camper in a closed position. Because of an increase in the height of the camper, the effective cross-sectional area increases the drag while in transport. A further disadvantage with the sidewall construction in the above camper is that the window structures cannot extend past the midline of the wall, since the hinge interrupts such structures. For example, a window may be placed in the top half of the sidewall, and another window may be placed in the bottom half of the sidewall. No single window extends the entire height of the sidewall. Moreover, the hinge detracts from the aesthetic qualities of the camper.

SUMMARY OF THE INVENTION

Accordingly, the present invention provides a fold-down camper having unitary rigid sidewalls which collapse for easy storage and transportation, yet can be erected to provide maximum living space. The present invention further provides a rigid sidewall construction which can be folded within the space of the frame and allowing the cap to ride flush with the frame when in a fully collapsed configuration. Moreover, the unitary rigid sidewall construction can accommodate full length window frames which substantially span the entire height of the sidewall.

The present invention is accomplished in a fold-down camper having a generally rectangular chassis supporting a frame adapted to be received and closed by a cap member. The frame or camper shell may have four walls, made of lightweight materials, defining a cavity in which the utensils and furnishings are stored. Along the upper edge of the frame is a section including hinge means for attaching the rigid sidewalls to the frame. The entire rigid sidewall can pivot about the section from an erect to a closed position. In the erect position, the sidewalls are substantially vertical and lie flush with the base frame. In a folded position, the sidewall rests entirely within the frame and substantially parallel to the chassis. When the rigid sidewall is in a folded position, the section retracts within the frame to provide space for receiving the cap such that the edges of the cap are substantially flush with the sides of the frame. Since the sidewall is a unitary sheet, it may contain windows or doors which are uninterrupted along the height of the wall.

The advantages and features of the present invention will become apparent from the following detailed description of the invention when considered in conjunction with the accompanying drawings, wherein:

DETAILED DESCRIPTION OF THE PREFERRED EMBODIMENTS

Figure 1:
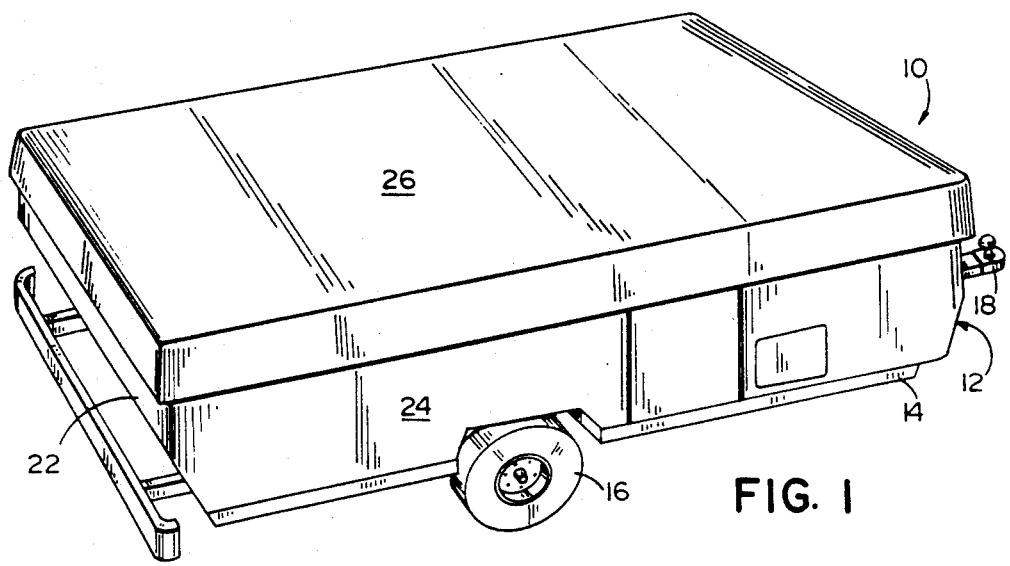
FIG. 1 is a perspective view of a fold-down tent camper in a closed or stored configuration.

In referring to the drawing figures, like reference numerals will be used to indicate similar components. Although the features of the invention will be described in reference to a fold-down camper, the invention may be applied equally as well to truck mounted campers, van campers and larger travel trailers.

Figure 2:
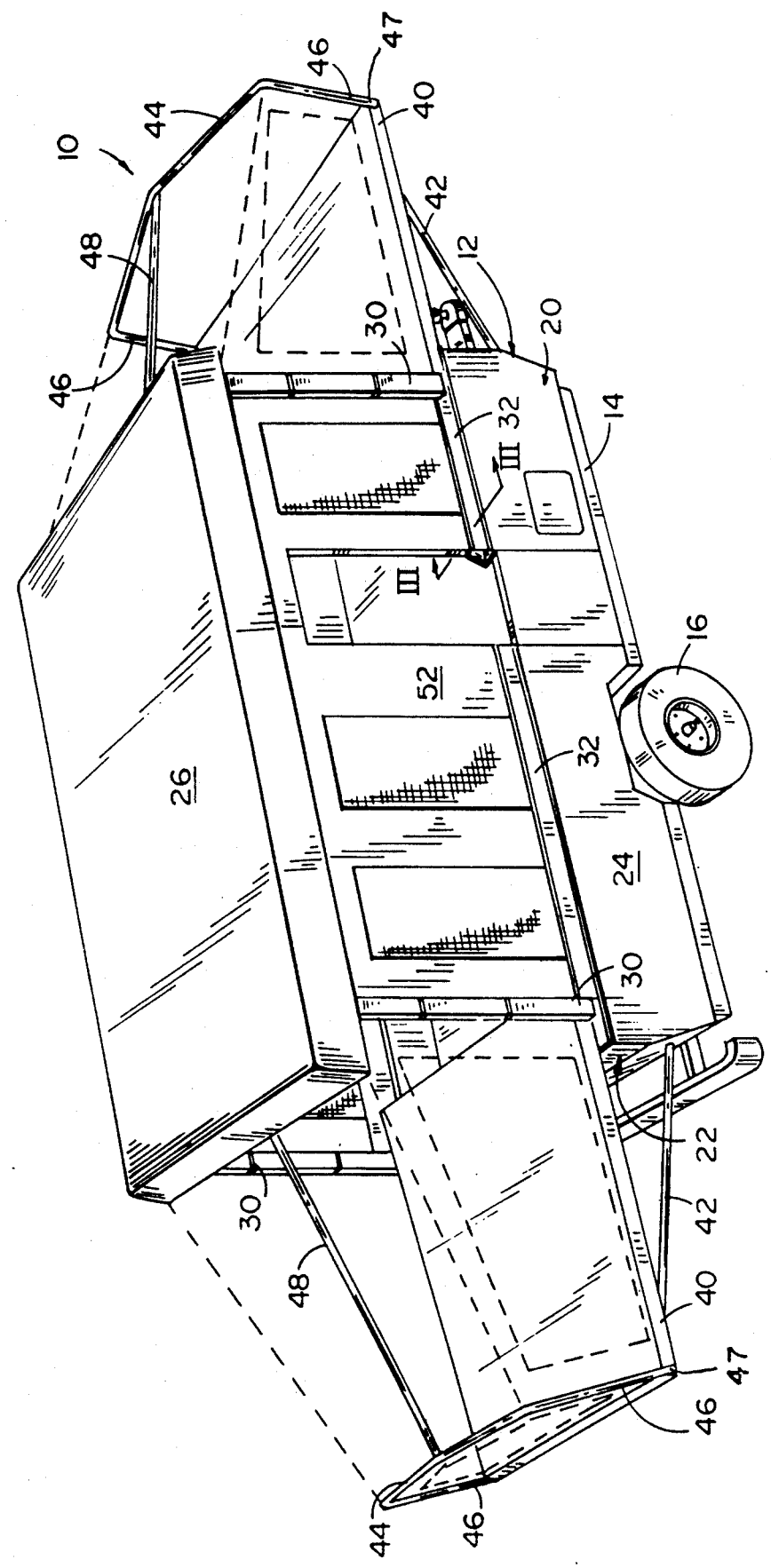
FIG. 2 is a perspective view of the fold-down tent camper of FIG. 1 in an extended and upright configuration.

FIGS. 1 and 2 generally illustrate one embodiment of the fold-down camper 10 in a closed and deployed configuration, respectively. Camper 10 may be comprised of a frame 12 mounted to a chassis 14. A trailer tongue 18 may extend from the chassis 14 in a conventional manner to couple with a conventional hitch on a vehicle. The camper may be equipped with one or more axles and wheel assemblies 16, as is necessary, depending upon the size of the camper and the load to be distributed. In addition, the camper may be equipped with its own braking system, as is known in the art.

The frame 12 comprising a lower camper shell 20 may have end walls 22 and sidewalls 24. As generally shown by the figure, each end wall 22 and sidewall 24 is of substantially the same height to form a substantially uniform edge to receive a camper top 26.

FIG. 2 is a perspective view of the fold-down tent camper 10 of FIG. 1 in an extended and upright configuration. The cap or top 26 is supported directly above frame 20 by a plurality of posts 30, each located near a corner of frame 20. It is preferred that each post 30 telescope vertically to deploy and lower the top with respect to the frame, however, a folding post may also be used. Posts 30 may be constructed from stainless steel or aluminum tubing and be actuated by an electrically or manually operated cable system (not shown).

Figures 3, 3A:
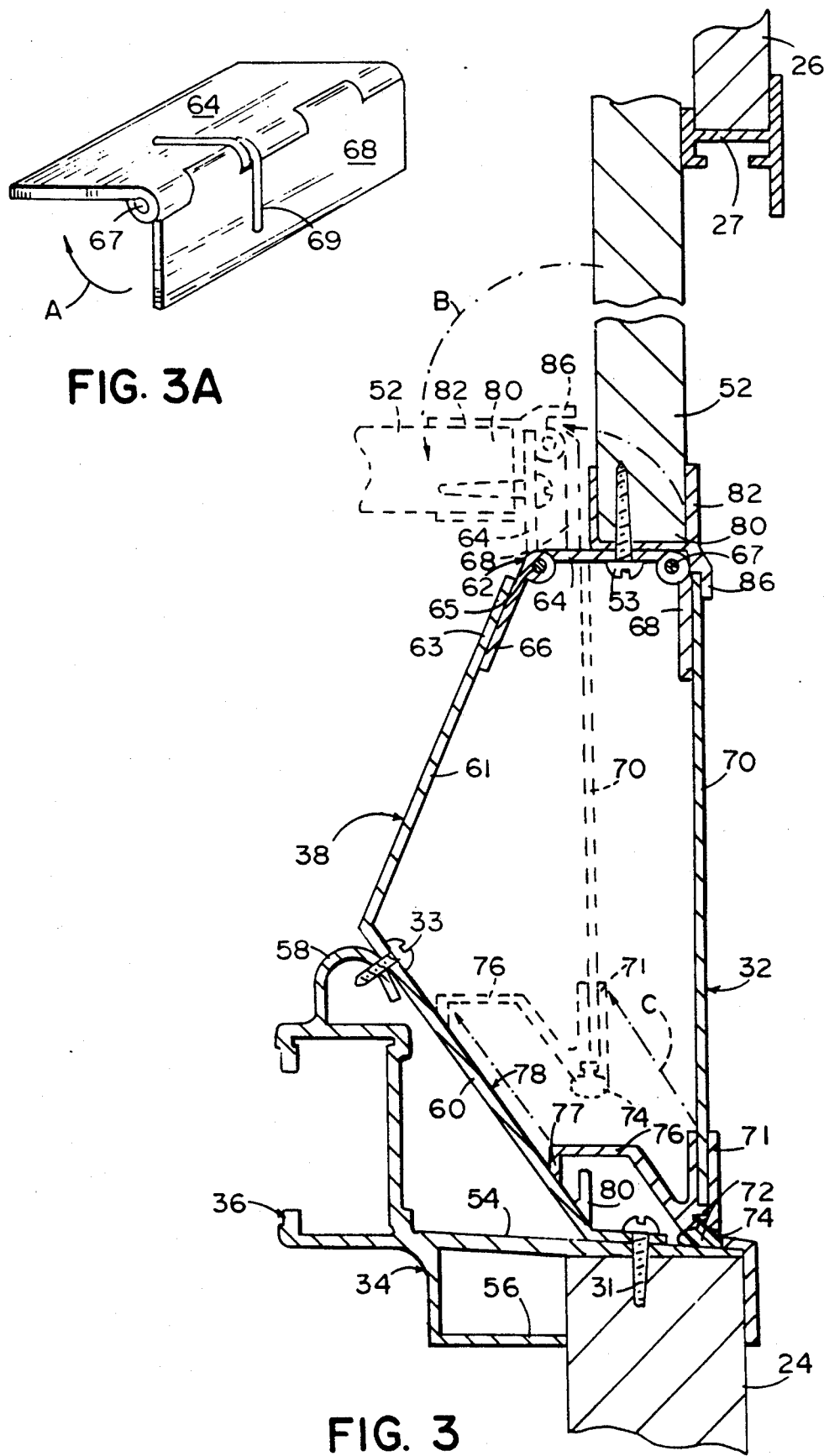
FIG. 3 is an enlarged fragmentary cross-sectional view of a preferred embodiment of the rigid sidewall enclosure section taken along line section III—III of FIG. 2.
FIG. 3A in an illustration of a spring hinge employed in the structure of FIG. 3.

Disposed along the upper edge of each sidewall 24 may be a hinged section or footwall 32. Each footwall 32, as best seen in FIG. 3, is comprised of an extruded wall cap 34 with an integrally formed channel 36 and a hinged wall 38, described in greater detail below. The wall cap 34 rests on and is fixed to the upper edge of each sidewall 24 so that the integral channel 36 is located on the inboard side of the wall. Each channel is adapted to receive a platform or bunk extension 40 (FIG. 2) located at each end of camper 10. Each platform 40 slides along channel 36 and is designed to fit within the confines defined by frame 12. When deployed, each platform may be drawn from camper 10 along each channel 36 and extended or cantilevered over each end of the frame. If desired, each platform may be supported in its extended position by braces 42 interconnecting the ends of the platform to frame 20.

Mounted to the outer ends of each platform 40 is an awning bow or arch 44 preferably constructed from a lightweight material such as aluminum alloy tubing. The ends 46 of each bow 44 are pivotally coupled by pivot means 47 near the far end of the platform allowing the bow to pivot about the coupling points. A stop may restrict the outward rotation of the bow to a point slightly beyond the vertical. The swing of the bow may also be restricted by a support rod 48 constructed from aluminum tubing and pivotally coupled to the highest point on bow 44. The opposite end of the support rod 48 may be detachably coupled by a spring pin to a point located along an inside edge of top 26. Bow 44 and support 48 shape and support a tent awning attached to each end of the camper to enclose the bunk platforms.

Traditionally the material used to enclose the bunk extensions was also used to form the walls interconnecting top 26 and frame 12. As illustrated in FIG. 2, and as contemplated by the instant invention, walls 52, interconnecting top 26 and sidewalls 24 of frame 12 are constructed from lightweight, yet high strength rigid materials. As will be described in greater detail below, rigid walls 52 are adapted to collapse within the confines of the frame when top 26 is lowered and encloses the frame.

FIG. 3 illustrates an upper edge of one sidewall 24 supporting hinged section or footwall 32 coupled by way of a hinge to wall 52. At the top of the figure, wall 52 is shown urged against the inside surface of camper top 26. The upper edge of sidewall 24 is received by and fixed to hinged footwall 32 by a sidewall cap 54 having a channel 56 for receiving the upper edge of the sidewall. The cap may be extruded from aluminum and extend substantially the length of the sidewall. In a preferred embodiment, the sidewall cap 54 is formed integrally with the channel 36, as described above. Sidewall cap 54 and channel 36 may be extruded from aluminum as a single piece. Formed along the upper edge of platform channel 36 may be a flange or bead 58 extending the length of the channel. As shown in the figure, the bead 58 is curved. Screws 31 secure member 54 to sidewall 24. An angular support member 38, of substantially the same length as sidewall cap 54, has one arm 60 anchored at a first point to cap 54 by screws 31 and at a second point to the bead 58 by screws 33. Coupled in this fashion, the lower arm 60 of angular support 38 is inclined toward the camper interior, while an upper arm 61 of the support is inclined outwardly toward the camper exterior.

Coupled to an upper edge 63 of angular support 38, and extending along a substantial portion of its length, is a hinge 62. The hinge 62 has a central hinge plate 64 coupled to lateral plates 66 and 68. As shown by the figure, lateral hinge plate 66 is attached to the upper edge 63 of angular support 60. Lateral hinge plate 68 is coupled to an upper end of a vertical support member 70 forming the outer portion of the hinged footwall 32. Pin 65 pivotally couples plates 66 and 64 while pin 67 pivotally couples plates 64 and 68. The hinge plates 66 and 68 may be permanently fixed to their respective portions of the hinge footwall by rivets or other fasteners such as screws or bolts. Whatever method is used, the spacing of the fasteners along the coupling should be sufficient to provide a firm connection. Hinge plates 64 and 68 are spring loaded by springs 69, such as shown by FIG. 3A, which extend over pin 67 and are spaced intermittently along the hinge joint between central hinge plate 64 and lateral hinge plate 68 so as to urge plates 64 and 68 together in a direction shown by arrow A in FIG. 3A.

The vertical support member 70 pendant from hinge plate 68 has a shoe 71 extending along its lower edge with a lower channel 72 therein to receive a rubber seal or complaint strip 74. Integrally extending from shoe 71 is a generally inverted C-shaped guide 76 designed to slidably engage the inclined surface 78 of angular support leg 60. At the lower portion of inclined surface 78 is a stop member 80. Stop 80 may be an integral part of angular support leg 60 and designed to engage downwardly depending leg 77 of guide 76 to prevent vertical member 70 from traveling beyond the edge of the wall cap 54.

Coupled transversely to central hinge plate 64 by a plurality of screws 53, and extending upwardly therefrom is rigid wall 52. Wall 52 may be constructed from a lightweight core sandwiched between sheets of fiberglass and/or aluminum to achieve the desired thickness, weight and strength. A lower edge 80 of the wall receives an aluminum channel 82 having a drip edge 86 which extends over the hinge joint between central hinge plate 62 and lateral plate 66 When wall 52 is in the vertical position. The aluminum channel 82 is fastened by screw 53 and provides added support to the coupling between wall 52 and the central hinge plate, as well as offer lateral support to the bottom of the wall.

The upper portion of FIG. 3 illustrates wall 52 butted against an inside edge of camper top 26 when the wall is in the upright position. The upper edge of wall 52 may be detachably coupled to top 26 by suitable means such as Velcro fasteners, or some other latching mechanism such as snaps or hooks.

FIG. 3 also illustrates, in phantom form, the relationships between the components of hinged footwall 32 with respect to the wall when placed in the stowed configuration. As shown in phantom lines, wall 52 can be uncoupled from the inside edge of top 26 and pivoted about the hinge pin 65 in a direction indicated by arrow B so as to lay substantially within the camper shell. With the upward travel of central plate 64 about the hinge pin 65, vertical support member 70 moves upwardly and in toward the camper shell as indicated by arrow C under the bias force provided by springs 69. Support 70 remains substantially vertical as it pivots about the hinge joint provided between plates 64 and 68 and is guided by shoe 71 along inclined surface 78 of angular support leg 60. The vertical orientation of support 70 is maintained by the hinge springs 69 located within the hinge joint between plates 64 and 68 and urging shoe 71 along inclined surface 78. With wall 52 stowed in a recumbent position and the vertical support 70 of footwall 32 drawn inwardly by the pivoting action of center hinge plate 64, sufficient clearance distance is provided along the outer portion of sidewall cap 34 to receive the lower edge molding 27 of camper top 26 when lowered to the closed position.

Figure 4:
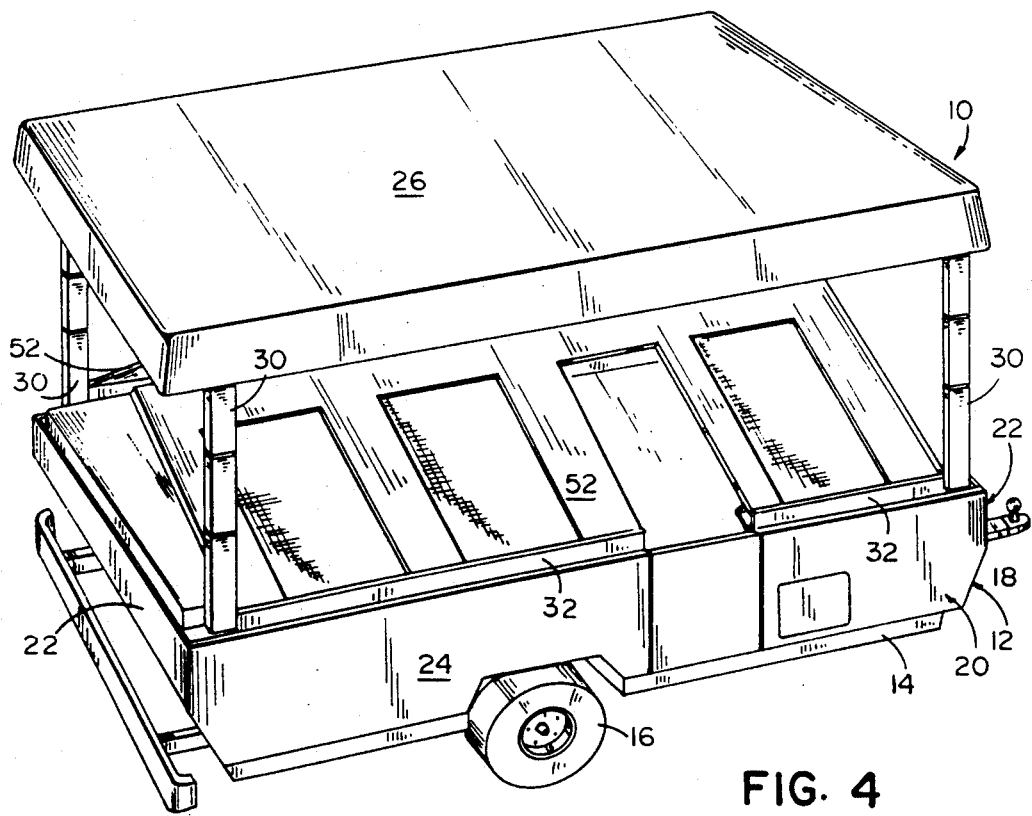
FIG. 4 is a perspective view of the fold-down tent camper of FIGS. 1 and 2 illustrating the camper in a partially deployed configuration.

FIG. 4 is a perspective view of the fold-down tent camper of FIGS. 1 and 2 illustrating the camper in a partially deployed configuration.

The raising and lowering of wall 52 may be accomplished simultaneously with the raising and lowering of cap 26 by providing appropriate cable linkage to the upper edge of the wall. The cable may be of a predetermined and fixed length. The cable may pass up through telescoping supports 30 or a parallel path, through a pulley coupled to the top and side edge of camper top 26. As the top 26 is raised, the pulley draws on the cable and gently raises wall 52 from the reclined position to a vertical position. Conversely, the wall may be lowered into the camper shell as the cap is lowered to the upper edge of the camper shell. In the alternative, the operator may physically raise and secure each wall once camper top 26 has been raised to the appropriate height.

The embodiments of the invention in which an exclusive property or privilege is claimed are defined as follows.

1. A fold-down camper, comprising:
- a frame mounted to a chassis and having a plurality of lower walls;
- a top engaging said plurality of lower walls closing said frame in a first position and adapted to be spaced above said frame in a second position;
- a footwall fixed to an upper edge of at least one of said plurality of lower walls, said footwall having an outer member movable in a substantially horizontal direction between a supporting position, and a retracted stowed position; and
- a sidewall hinged to an upper edge of said footwall pivotal from a stowed position within said frame with said top in said first position to an upright position above said footwall with said top in said second position.

2. A camper, comprising:
- a camper shell having a frame of substantially uniform height, said frame having at least two opposing sidewalls;
- a footwall mounted to a top edge of said at least two sidewalls, said footwall having a member movable in a substantially horizontal direction exposing an upper edge of said at least two sidewalls in a stowed position, and engaging said upper edge of said at least two sidewalls in an upright position;
- a sidewall coupled to an upper edge of said footwall and adapted to rotate from a reclined and stowed position within said camper shell to a substantially upright position above said footwall;
- a top adapted to engage said upper edge of said at least two sidewalls closing said camper shell and to be disposed above and opening said camper shell, said top also adapted to receive an upper edge of said sidewall in said substantially upright position;
- means for raising and lowering said top with respect to said camper shell; and
- means coupled to said raising means for raising and lowering said sidewall coincident with the raising and lowering of said top.

3. A rigid wall for a collapsible camper, comprising:
- a camper shell having a frame of substantially uniform height, said frame having at least two, substantially vertical and opposing sidewalls;
- a top closing said camper shell in a first position, resting along an upper edge of said sidewalls and adapted to be disposed above said camper shell in a second position;
- a retractable footwall coupled to an upper edge of said at least two opposing sidewalls having a portion adapted to move in a substantially horizontal direction between a first and second position exposing part of the upper edge of the sidewall with the top in said first position, and concealing said upper edge of said sidewall with said top in said second position;
- a unitary hardwall coupled to said retractable footwall and mechanically coupled to said top, said unitary hardwall having a first substantially horizontal position within said camper shell with said top in said first position and having a second substantially vertical position above said footwall with said top in said second position; and
- means for moving said unitary hardwall between said first position and said second position simultaneously with the movement of said top.

4. The fold-down camper as defined in claim 1, wherein said footwall includes a fixed inner member, a central plate pivotally coupled to an upper edge of said fixed inner member and coupled to a lower edge of said sidewall, and a pendant outer member hinged to an opposite edge of said central plate.

5. The fold-down camper as defined in claim 4, further including means biasing said pendant outer member toward said fixed inner member.

6. The fold-down camper as defined in claim 5, further comprising means coupled to said top and said sidewall for moving said top and said sidewall between said first and said second position.

7. The fold-down camper as defined in claim 1, wherein said footwall comprises:
   a first vertical member fixed to an upper edge of at least one of said plurality of lower walls;
   a central plate pivotally coupled to an upper edge of said vertical member;
   said outer member pivotally coupled to and suspended from said central plate on a side opposite the coupling with said first vertical member;
   means disposed between said central plate and said outer member for urging said outer member toward said first vertical member;
   means coupled to a lower end of said outer member for maintaining a spacing of said outer member from said first vertical member; and
   said outer member having a lower edge engaging said at least one of said plurality of lower walls with said sidewall rotated to said upright position and said outer member retracted inwardly toward said first vertical member with said sidewall rotated to said stowed position.

8. The camper of claim 2, wherein said footwall further comprises:
   a wall cap fixed along the top edge of said at least two sidewalls;
   a first vertical support member having one edge fixed to said wall cap;
   a central plate hinged to opposing first and a second lateral plates, and affixed to a lower edge of said sidewall, said central plate interconnected to said first vertical support member by said first lateral plate;
   a second support member interconnected to said central plate by said second lateral plate and pendant therefrom, said second vertical support member having a gauging means disposed along a lower edge and adapted to engage said first support member; and
   means disposed between said central plate and said second lateral plate for urging said gauging means against said first vertical support member so that said second vertical support member moves upward and toward said first support member when said sidewall and said central plate rotate upwardly about the hinge with said first lateral plate.

9. The camper of claim 2, wherein said means for raising and lowering said top with respect to said camper shell, comprises:
   a plurality of collapsible telescopic posts interconnecting said top to said frame;
   cable means coupled to said posts; and
   means coupled to said cable means for extending and lowering said posts.

10. The camper of claim 2, wherein said means coupled to said raising means for raising and lowering said sidewall, comprises;
   a cable of fixed length having one end fixed to an upper end of said sidewall and an opposite end coupled to said frame; and
   pulley means disposed in said top and receiving said cable extending between said top and said frame.

* * * * *

UNITED STATES PATENT AND TRADEMARK OFFICE
CERTIFICATE OF CORRECTION

PATENT NO. : 5,135,278

DATED : August 4, 1992

INVENTOR(S) : Ira H. Kauffman et al.

It is certified that error appears in the above-identified patent and that said Letters Patent is hereby corrected as shown below:

Column 1, line 66;
    "180" should be --180 degrees--.

Column 5, line 12;
    "When" should be --when--.

Signed and Sealed this

Second Day of November, 1993

BRUCE LEHMAN

*Attest:*

*Attesting Officer*  *Commissioner of Patents and Trademarks*